(12) United States Patent
Bigorra Llosas et al.

(10) Patent No.: US 8,758,790 B2
(45) Date of Patent: Jun. 24, 2014

(54) USE OF MICROCAPSULES FOR MAKING PAINTS AND LACQUERS

(75) Inventors: Joaquin Bigorra Llosas, Sabadell (ES); Josep-Lluis Viladot Petit, Barcelona (ES); Elisabet Graupera, Barcelona (ES); Otilia Par, Barcelona (ES); Heinz-Guenther Schulte, Kaarst (DE); Andres Ortuno, Barcelona (ES)

(73) Assignee: Cognis IP Management GmbH, Duesseldorf (DE)

( * ) Notice: Subject to any disclaimer, the term of this patent is extended or adjusted under 35 U.S.C. 154(b) by 1080 days.

(21) Appl. No.: 11/703,859

(22) Filed: Feb. 8, 2007

(65) Prior Publication Data

US 2007/0202139 A1  Aug. 30, 2007

(30) Foreign Application Priority Data

Feb. 8, 2006  (EP) .................................. 06002518

(51) Int. Cl.
 *A01N 25/34* (2006.01)
 *A61K 9/50* (2006.01)
(52) U.S. Cl.
 USPC .......................................... 424/408; 424/490
(58) Field of Classification Search
 CPC .................................. A01N 25/34; A61K 9/50
 USPC ............. 428/402–402.24; 427/213.3–213.36;
 264/4–4.7
 See application file for complete search history.

(56) References Cited

U.S. PATENT DOCUMENTS

| 6,488,870 B1 * | 12/2002 | Chopra et al. .................. 264/4.1 |
| 6,733,790 B1 * | 5/2004 | Garces Garces .............. 424/497 |
| 2004/0176487 A1 * | 9/2004 | Svedberg et al. ............... 521/56 |

FOREIGN PATENT DOCUMENTS

| EP | 1464385 A1 * | 4/2003 |
| JP | 02 293041 A | 12/1990 |

OTHER PUBLICATIONS

Database WPI Section Ch, Week 199103, Derwent Publications Ltd., London, GB; Class A97, AN 1991-019501 XP002388671 & JP 02 293041 A (Matsumoto Yushi Seiyaku KK) Dec. 4, 1990.

* cited by examiner

*Primary Examiner* — Randy Gulakowski
*Assistant Examiner* — Jeffrey Washville
(74) *Attorney, Agent, or Firm* — Servilla Whitney LLC

(57) ABSTRACT

The invention provides microcapsules having an average diameter of 0.1 to 25 μm, obtained by a process (a) or (b), wherein, (a1) preparing an aqueous emulsion comprising actives and optionally oil components and/or emulsifiers;

(a2) treating the emulsifier with an aqueous solution of anionic polymers to form a matrix;

(a3) contacting the matrix with an aqueous solution of cationic polymers to form a capsule and optionally (a4) separating the aqueous phase from the capsules, or (b1) preparing an aqueous emulsion containing actives and optionally oil components and/or emulsifiers;

(b2) treating the aqueous emulsion with an aqueous solution of cationic polymers to form a matrix;

(b3) contacting the matrix with an aqueous solution of an anionic polymer to form a capsule and optionally (b4) separating the aqueous phase from the capsule.

The microcapsules are useful in paint and lacquer formulations.

15 Claims, No Drawings

USE OF MICROCAPSULES FOR MAKING PAINTS AND LACQUERS

CROSS-REFERENCE TO RELATED APPLICATIONS

This application claims priority from European application number EP 06002518.6 filed Feb. 8, 2006, the entire contents of which are incorporated herein by reference.

FIELD OF THE INVENTION

The present invention belongs to the field of paints and lacquers and relates to the use of defined types of encapsulated actives for making paints and lacquers and paints and lacquers comprising said encapsulated actives.

BACKGROUND OF THE INVENTION

Paint and lacquer compositions typically include colorant particles dispersed in a resinous binder. In addition, those products may comprise further auxiliaries, more particularly active ingredients providing for example a fresh smell or protecting the objects, which have been treated with the paints or lacquers, against insects, corrosion and the like. Unfortunately, very often those actives do not show a sufficient stability in the final composition, either since they interfere with other ingredients or they are simply disintegrated by light or water. A simple solution to this problem could be to encapsulate such actives in order to achieve both, a protection of the compounds and their controlled release over a longer period of time. Nevertheless, what one can observe is that well known microcapsules, for example based on gelatine as a matrix, show a strong tendency to increase the viscosity of the paints and lacquers, especially when storage takes place at elevated temperatures, which is definitely unwanted by the customer. Another serious disadvantage is that paints comprising common microcapsules when applied on surface provide films of poor quality, since they show lots of visual defects, like spots and craters, since e.g. the size distribution is not narrow enough and comprise too many particles with large diameters.

The object of the present invention has therefore been to provide a solution to said complex problem and to develop paints and lacquers comprising encapsulated actives which show improved storage stability and exhibit a superior film quality.

BRIEF DESCRIPTION OF THE INVENTION

The present invention claims microcapsules having an average diameter of 0.1 to 25 μm, obtained by process (a) or (b)

(a1) an emulsion is prepared comprising actives and optionally oil components and/or emulsifiers;
(a2) said composition is treated with aqueous solutions of anionic polymers to form a matrix;
(a3) said matrix is brought into contact with aqueous solutions of cationic polymers to form a capsule and optionally
(a4) said capsules being separated from the aqueous phase, or
(b1) an emulsion is prepared comprising actives and optionally oil components and/or emulsifiers;
(b2) said composition is treated with an aqueous solution comprising a cationic polymer to form a matrix;
(b3) said matrix is brought into contact with an aqueous solution of anionic polymers to form a capsule and optionally
(b4) said capsules being separated from the aqueous phase,
for making paints and lacquers.

Surprisingly, it has been found that the cited microcapsules obtained from the coazervation of anionic and cationic polymers solve the complex problem, since they do not raise the viscosity when introduced into the final formulation, even when stored at elevated temperatures over a period of two months. Moreover, the paint films do not exhibit visual defects, spots or craters due to the fact that the specific microcapsules show a regular form with a soft, flexible shell and exhibit a small and narrow size distribution.

Therefore, microcapsules which were found particular useful for the claimed application, show a size distribution where at least 50% b.w. of said capsules have a diameter between 0.5 and 5 and more particularly between 1 and 4 μm.

Actives

Although the nature of the active is not critical for the present invention, preferred examples are perfumes, fragrances, aromas, insecticides and biocides.

DETAILED DESCRIPTION OF THE INVENTION

Perfumes, Fragrances and Aromas

Suitable perfume oils are mixtures of natural and synthetic perfumes. Natural perfumes include the extracts of blossoms (lily, lavender, rose, jasmine, neroli, ylang-ylang), stems and leaves (geranium, patchouli, petitgrain), fruits (anise, coriander, caraway, juniper), fruit peel (bergamot, lemon, orange), roots (nutmeg, angelica, celery, cardamom, costus, iris, calmus), woods (pinewood, sandalwood, guaiac wood, cedarwood, rosewood), herbs and grasses (tarragon, lemon grass, sage, thyme), needles and branches (spruce, fir, pine, dwarf pine), resins and balsams (galbanum, elemi, benzoin, myrrh, olibanum, opoponax). Animal raw materials, for example civet and beaver, may also be used. Typical synthetic perfume compounds are products of the ester, ether, aldehyde, ketone, alcohol and hydrocarbon type. Examples of perfume compounds of the ester type are benzyl acetate, phenoxyethyl isobutyrate, p-tert.butyl cyclohexylacetate, linalyl acetate, dimethyl benzyl carbinyl acetate, phenyl ethyl acetate, linalyl benzoate, benzyl formate, ethylmethyl phenyl glycinate, allyl cyclohexyl propionate, styrallyl propionate and benzyl salicylate. Ethers include, for example, benzyl ethyl ether while aldehydes include, for example, the linear alkanals containing 8 to 18 carbon atoms, citral, citronellal, citronellyloxyacetaldehyde, cyclamen aldehyde, hydroxycitronellal, lilial and bourgeonal. Examples of suitable ketones are the ionones, isomethylionone and methyl cedryl ketone. Suitable alcohols are anethol, citronellol, eugenol, isoeugenol, geraniol, linalool, phenylethyl alcohol and terpineol. The hydrocarbons mainly include the terpenes and balsams. However, it is preferred to use mixtures of different perfume compounds which, together, produce an agreeable perfume. Other suitable perfume oils are essential oils of relatively low volatility which are mostly used as aroma components. Examples are sage oil, camomile oil, clove oil, melissa oil, mint oil, cinnamon leaf oil, lime-blossom oil, juniper berry oil, vetiver oil, olibanum oil, galbanum oil, ladanum oil and lavendin oil. The following are preferably used either individually or in the form of mixtures: bergamot oil, dihydromyrcenol, lilial, lyral, citronellol, phenylethyl alcohol, hexylcinnamaldehyde, geraniol, benzyl acetone, cyclamen aldehyde, linalool, Boisambrene Forte, Ambroxan, indole, hedione, sandelice, citrus oil, mandarin oil, orange oil, allylamyl glycolate, cyclovertal, lavendin oil, clary oil, damascone, geranium oil bourbon, cyclohexyl salicylate, Vertofix Coeur, Iso-E-Super, Fixolide NP, evernyl, iraldein gamma, phenylacetic acid, geranyl acetate, benzyl acetate, rose oxide, romillat, irotyl and floramat.

Insecticides and Biocides

Examples for suitable insecticides and biocides are sesquiterpenes, Diethyltoluamid (DEET), Ethyl Butylacetylaminopropionate (IR3535), Hydroxyethyl Isobutyl Piperidine Carboxylate and preferably pyrethroides and their mixtures. Typical representatives for pyrethroides are 5-Benzyl-3-furylmethyl(+)-cis-(1R,3S,E)2,2-dimethyl-3-(2-oxo-2,3,4,5-tetrahyfrothiophenylidenmethyl)cyclopropancarboxylate, 6-Chloropiperonyl 2,2-dimethyl-3-(2-methylpropenyl) cyclopropancarboxylate, Acrinathrin, Allethrin, Bifentrin, Bioresmethrin, Cismethrin, Cyclethrin, Cycloprothrin, Cyfluthrin, Cyhalothrin, Cypermethrin, Cyphenotrin, Deltamethrin, Dimethrin, Empenthrin, Esfenvalerat, Fenfluthrin, Fenpropathrin, Fenvalerat, Flucythrinat, Flumethrin, Fluvalinat, Furethrin, Halfenprox, Imiprothrin, Methyl cis/trans-3-(2,2-dichlorovinyl)-2,2-dimethylcyclopropan-1-carboxylat, and particularly Permethrin and their mixtures. Also useful as biocides are certain pigments like the oxides of copper.

Oil Components

Although the actives usually represent oil phases the addition of further oil components can form another preferred embodiment of the present invention in order to introduce carriers into the capsules or to improve the lipophilic nature of the inner phase. Suitable oil components, which form constituents of the O/W emulsions, are, for example, Guerbet alcohols based on fatty alcohols having 6 to 18, preferably 8 to 10, carbon atoms, esters of linear $C_6$-$C_{22}$ fatty acids with linear or branched $C_6$-$C_{22}$ fatty alcohols or esters of branched $C_6$-$C_{13}$ carboxylic acids with linear or branched $C_6$-$C_{22}$ fatty alcohols, such as, for example, myristyl myristate, myristyl palmitate, myristyl stearate, myristyl isostearate, myristyl oleate, myristyl behenate, myristyl erucate, cetyl myristate, cetyl palmitate, cetyl stearate, cetyl isostearate, cetyl oleate, cetyl behenate, cetyl erucate, stearyl myristate, stearyl palmitate, stearyl stearate, stearyl isostearate, stearyl oleate, stearyl behenate, stearyl erucate, isostearyl myristate, isostearyl palmitate, isostearyl stearate, isostearyl isostearate, isostearyl oleate, isostearyl behenate, isostearyl oleate, oleyl myristate, oleyl palmitate, oleyl stearate, oleyl isostearate, oleyl oleate, oleyl behenate, oleyl erucate, behenyl myristate, behenyl palmitate, behenyl stearate, behenyl isostearate, behenyl oleate, behenyl behenate, behenyl erucate, erucyl myristate, erucyl palmitate, erucyl stearate, erucyl isostearate, erucyl oleate, erucyl behenate and erucyl erucate. Also suitable are esters of linear $C_6$-$C_{22}$ fatty acids with branched alcohols, in particular 2-ethylhexanol, esters of $C_{18}$-$C_{38}$ alkylhydroxy carboxylic acids with linear or branched $C_6$-$C_{22}$ fatty alcohols, in particular dioctyl malate, esters of linear and/or branched fatty acids with polyhydric alcohols (such as, for example, propylene glycol, dimerdiol or trimertriol) and/or Guerbet alcohols, triglycerides based on $C_6$-$C_{10}$ fatty acids, liquid mono-/di-/triglyceride mixtures based on $C_6$-$C_{18}$ fatty acids, esters of $C_6$-$C_{22}$ fatty alcohols and/or Guerbet alcohols with aromatic carboxylic acids, in particular benzoic acid, esters of $C_2$-$C_{12}$ dicarboxylic acids with linear or branched alcohols having 1 to 22 carbon atoms or polyols having 2 to 10 carbon atoms and 2 to 6 hydroxyl groups, vegetable oils, branched primary alcohols, substituted cyclohexanes, linear and branched $C_6$-$C_{22}$ fatty alcohol carbonates, such as, for example, dicaprylyl carbonate (Cetiol® CC), Guerbet carbonates, based on fatty alcohols having 6 to 18, preferably 8 to 10, carbon atoms, esters of benzoic acid with linear and/or branched $C_6$-$C_{22}$ alcohols (e.g. Finsolv® TN), linear or branched, symmetrical or asymmetrical dialkyl ethers having 6 to 22 carbon atoms per alkyl group, such as, for example, dicaprylyl ether (Cetiol® OE), ring-opening products of epoxidized fatty acid esters with polyols, silicone oils (cyclomethicones, silicone methicone grades, etc.), aliphatic or naphthenic hydrocarbons, such as, for example, squalane, squalene or dialkylcyclohexanes, and/or mineral oils.

Emulsifiers

In another preferred embodiment of the present invention emulsifiers are used for preparing the compositions, which more preferably represent non-ionic surfactants. Typical examples are:

- products of the addition of 2 to 30 mol ethylene oxide and/or 0 to 5 mol propylene oxide onto linear $C_{8-22}$ fatty alcohols, onto $C_{12-22}$ fatty acids and onto alkyl phenols containing 8 to 15 carbon atoms in the alkyl group;
- $C_{12-18}$ fatty acid monoesters and diesters of addition products of 1 to 30 mol ethylene oxide onto glycerol;
- glycerol mono- and diesters and sorbitan mono- and diesters of saturated and unsaturated fatty acids containing 6 to 22 carbon atoms and ethylene oxide addition products thereof;
- addition products of 15 to 60 mol ethylene oxide onto castor oil and/or hydrogenated castor oil;
- polyol esters and, in particular, polyglycerol esters such as, for example, polyglycerol polyricinoleate, polyglycerol poly-12-hydroxy-stearate or polyglycerol dimerate isostearate. Mixtures of compounds from several of these classes are also suitable;
- addition products of 2 to 15 mol ethylene oxide onto castor oil and/or hydrogenated castor oil;
- partial esters based on linear, branched, unsaturated or saturated $C_{6-22}$ fatty acids, ricinoleic acid and 12-hydroxystearic acid and glycerol, polyglycerol, pentaerythritol, dipentaerythritol, sugar alcohols (for example sorbitol), alkyl glucosides (for example methyl glucoside, butyl glucoside, lauryl glucoside) and polyglucosides (for example cellulose);
- $C_6$-$C_{22}$ alkyl and/or alkenyl oligoglycosides
- mono-, di and trialkyl phosphates and mono-, di- and/or tri-PEG-alkyl phosphates and salts thereof;
- wool wax alcohols;
- polysiloxane/polyalkyl polyether copolymers and corresponding derivatives;
- mixed esters of pentaerythritol, fatty acids, citric acid and fatty alcohol and/or mixed esters of $C_{6-22}$ fatty acids, methyl glucose and polyols, preferably glycerol or polyglycerol,
- polyalkylene glycols and
- glycerol carbonate.

The addition products of ethylene oxide and/or propylene oxide onto fatty alcohols, fatty acids, alkylphenols, glycerol mono- and diesters and sorbitan mono- and diesters of fatty acids or onto castor oil are known commercially available products. They are homologue mixtures of which the average degree of alkoxylation corresponds to the ratio between the quantities of ethylene oxide and/or propylene oxide and substrate with which the addition reaction is carried out. $C_{12/18}$ fatty acid monoesters and diesters of addition products of ethylene oxide onto glycerol are known as lipid layer enhancers for cosmetic formulations. The preferred emulsifiers are described in more detail as follows:

Alk(en)yl Oligoglycosides

The alkyl or alkenyl oligoglycosides may be derived from aldoses or ketoses containing 5 or 6 carbon atoms, preferably glucose. Accordingly, the preferred alkyl and/or alkenyl oligoglycosides are alkyl or alkenyl oligoglucosides. These materials are also known generically as "alkyl polyglycosides" (APG). Preferably, the alk(en)yl oligoglycosides correspond to formula (I):

$$R^1O[G]_p \quad (I)$$

wherein $R^1$ is an alkyl or alkenyl radical having from 6 to 22 carbon atoms, G is a sugar unit having 5 or 6 carbon atoms and p is a number from 1 to 10. The index p in general formula (I) indicates the degree of oligomerisation (DP degree), i.e. the distribution of mono- and oligoglycosides, and is a number of 1 to 10. Whereas p in a given compound must always be an integer and, above all, may assume a value of 1 to 6, the value p for a certain alkyl oligoglycoside is an analytically determined calculated quantity which is mostly a broken number. Alk(en)yl oligoglycosides having an average degree of oligomerisation p of 1.1 to 3.0 are preferably used. Alk(en)yl oligoglycosides having a degree of oligomerisation below 1.7 and, more particularly, between 1.2 and 1.4 are preferred from the applicational point of view. Alkyl oligoglucosides based on hydrogenated $C_8$-$C_{16}$ coconut oil alcohol having a DP of 1 to 3 are preferred.

Partial Glycerides

Typical examples of suitable partial glycerides are hydroxystearic acid monoglyceride, hydroxystearic acid diglyceride, isostearic acid monoglyceride, isostearic acid diglyceride, oleic acid monoglyceride, oleic acid diglyceride, ricinoleic acid monoglyceride, ricinoleic acid diglyceride, linoleic acid monoglyceride, linoleic acid diglyceride, linolenic acid monoglyceride, linolenic acid diglyceride, erucic acid monoglyceride, erucic acid diglyceride, tartaric acid monoglyceride, tartaric acid diglyceride, citric acid monoglyceride, citric acid diglyceride, malic acid monoglyceride, malic acid diglyceride and technical mixtures thereof which may still contain small quantities of triglyceride from the production process. Addition products of 1 to 30 and preferably 5 to 10 mol ethylene oxide onto the partial glycerides mentioned are also suitable.

Sorbitan Esters

Suitable sorbitan esters are sorbitan monoisostearate, sorbitan sesquiisostearate, sorbitan diisostearate, sorbitan triisostearate, sorbitan monooleate, sorbitan sesquioleate, sorbitan dioleate, sorbitan trioleate, sorbitan monoerucate, sorbitan sesquierucate, sorbitan dierucate, sorbitan trierucate, sorbitan monoricinoleate, sorbitan sesquiricinoleate, sorbitan diricinoleate, sorbitan triricinoleate, sorbitan monohydroxystearate, sorbitan sesquihydroxystearate, sorbitan dihydroxystearate, sorbitan trihydroxystearate, sorbitan monotartrate, sorbitan sesquitartrate, sorbitan ditartrate, sorbitan tritartrate, sorbitan monocitrate, sorbitan sesquicitrate, sorbitan dicitrate, sorbitan tricitrate, sorbitan monomaleate, sorbitan sesquimaleate, sorbitan dimaleate, sorbitan trimaleate and technical mixtures thereof. Addition products of 1 to 30 and preferably 5 to 10 mol ethylene oxide onto the sorbitan esters mentioned are also suitable.

Polyglycerol Esters

Typical examples of suitable polyglycerol esters are polyglyceryl-2 dipolyhydroxystearate (Dehymuls® PGPH), polyglycerin-3-diisostearate (Lameform® TGI), polyglyceryl-4 isostearate (Isolan® GI 34), polyglyceryl-3 oleate, diisostearoyl polyglyceryl-3 diisostearate (Isolan® PDI), polyglyceryl-3 methylglucose distearate (Tego Care® 450), polyglyceryl-3 beeswax (Cera Bellina®), polyglyceryl-4 caprate (polyglycerol caprate T2010/90), polyglyceryl-3 cetyl ether (Chimexane® NL), polyglyceryl-3 distearate (Cremophor® GS 32) and polyglyceryl polyricinoleate (Admul® WOL 1403), polyglyceryl dimerate isostearate and mixtures thereof. Examples of other suitable polyesters are the mono-, di- and triesters of trimethylol propane or pentaerythritol with lauric acid, cocofatty acid, tallow fatty acid, palmitic acid, stearic acid, oleic acid, behenic acid and the like optionally reacted with 1 to 30 mol ethylene oxide.

Anionic Polymers

The use of anionic polymers like anionic polysaccharides, e.g. carboxymethyl cellulose and especially the use of poly(meth)acrylic acids and their esters is preferred, since the capsules based on these raw materials show a very regular size and do not exhibit any residue when used in the final paint or lacquer composition. The most preferred anionic polymer is a polyacrylate based on glycerol suspended in glycerol, which is obtainable in the market under the trademark Hispagel® (Cognis). Also salts of alginic acid are useful for this purpose. The alginic acid is a mixture of carboxyl-containing polysaccharides with the following idealized monomer unit:

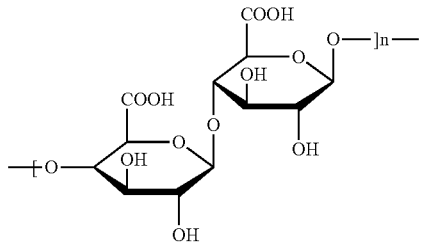

The average molecular weight of the alginic acid or the alginates is in the range from 150,000 to 250,000. Salts of alginic acid and complete and partial neutralization products thereof are understood In particular to be the alkali metal salts, preferably sodium alginate ("algin") and the ammonium and alkaline earth metal salts. Mixed alginates, for example sodium/magnesium or sodium/calcium alginates, are particularly preferred. In an alternative embodiment of the invention, however, anionic chitosan derivatives, for example the carboxylation and above all succinylation products are also suitable for this purpose. Usually, the anionic polymers are used in quantities of 0.01 to 1, preferably 0.05 to 0.1% b.w.—calculated on the weight of the final microcapsule.

Cationic Polymers

Suitable cationic polymers are, for example, cationic cellulose derivatives such as the quaternized hydroxyethyl cellulose obtainable from Amerchol under the name of Polymer JR 400®, cationic starch, copolymers of diallyl ammonium salts and acrylamides, quaternized vinyl pyrrolidone/vinyl imidazole polymers such as, for example, Luviquat® (BASF), condensation products of polyglycols and amines, quaternized collagen polypeptides such as, for example, Lauryldimonium Hydroxypropyl Hydrolyzed Collagen (Lamequat® L, Grünau), quaternized wheat polypeptides, polyethyleneimine, cationic silicone polymers such as, for example, amodimethicone, copolymers of adipic acid and dimethylaminohydroxypropyl diethylenetriamine (Cartaretine®, Sandoz), copolymers of acrylamide with dimethyl diallyl ammonium chloride (Merquat® 550, Chemviron), polyaminopolyamides and crosslinked water-soluble polymers thereof, condensation products of dihaloalkyls, for example dibromobutane, with bis-dialkylamines, for example bis-dimethylamino-1,3-propane, quaternized ammonium salt polymers such as, for example, Mirapol® A-15, Mirapol® AD-1, Mirapol® AZ-1 of Miranol and their mixtures. Also useful are cationic polymers of natural origin, e.g. chitosan or (cationic) whey proteins. Usually, the cationic polymers are used in quantities of 0.01 to 1, preferably 0.05 to 0.1% b.w.—calculated on the weight of the final micro-capsule.

INDUSTRIAL APPLICATION

As outlined above, the microcapsules according to the present invention provide superior properties to paints and lacquers than other capsules found in the market. Therefore, another object of the present invention is directed to paints and lacquers comprising microcapsules having an average diameter of 0.1 to 25 μm, and obtainable in that (a1) an emulsion is prepared comprising actives and optionally emulsifiers,
(a2) said composition is treated with aqueous solutions of anionic polymers to form a matrix,
(a3) said matrix is brought into contact with aqueous solutions of cationic polymers to form a capsule and optionally
(a4) said capsules being separated off from the aqueous phase, or (b1) an emulsion is prepared comprising actives and optionally emulsifiers,
(b2) said composition is treated with aqueous solutions of cationic polymers to form a matrix,
(b3) said matrix is brought into contact with aqueous solutions of anionic polymers to form a capsule and optionally
(b4) said capsules being separated off from the aqueous phase.

In particular, those paints and lacquers comprising microcapsules are preferred where at least 50% b.w. of said capsules show a diameter of 0.1 to 5 μm. Typically, the content of said microcapsules in said paints and lacquers lies between 0.01 and 15, preferably 0.1 to 10 and more preferably 1 to 5% b.w.

EXAMPLES

Example 1

Preparation of an Encapsulated Perfume

In a first 250 ml flask 50 g of glycerol polyacrylate in glycerol (Hispagel® 50, Cognis) were placed and agitated at 20° C. with 14 g of water and 0.5 g butyl paraben (Phenonip®). The pH value of the resulting component A was adjusted to approximately 5.5 by adding either sodium hydroxide solution or citric acid. In a second 100 ml flask 20 g of perfume (Blau 111084) were placed and mixed at 20° C. with 0.5 g of a mixture of sorbitol esters (Dehymuls® SMO amd Polysorbat 20, weight ratio 1:1, both Cognis) to form component B. Finally, in a third 100 ml flask 5 g of a cationic polymer (Polyquart® 701 NA, Cognis) were placed and dispersed in 10 g water under vigorous agitation to form component C. Subsequently, components B was drop wise and under vigorous agitation given to component A. Once the mixture was homogenized, component C was also added drop by drop to form the capsules. Table 1 shows their size distribution:

TABLE 1

| Size distribution | |
|---|---|
| Diameter [μm] | Percentage b.w. |
| 1 | 2 |
| 2 | 17 |
| 3 | 18 |
| 4 | 19 |
| 5 | 12 |
| 6 | 7 |
| 7 | 6 |
| 8 | 5 |
| 9 | 4 |
| 10 | 3 |
| 11 | 3 |
| 12 | 2 |
| 13 | 1 |
| 14 | 0 |
| 15 | 1 |
| 16 | 0 |

Example 2

Preparation of an Encapsulated Insecticide

In a first 250 ml flask 50 g of polyacrylic acid (Pemulen® TR-2) were placed and agitated at 20° C. with 14 g of water and 0.5 g butyl paraben (Phenonip®). The pH value of the resulting component A was adjusted to approximately 5.5 by adding either sodium hydroxide solution or citric acid. In a second 100 ml flask 20 g of an insecticide (permethrin) were placed and mixed at 20° C. with 0.5 g of a mixture of sorbitol esters (Dehymuls® SMO and Polysorbat 20, weight ratio 1:1, both Cognis) to form component B. Finally, in a third 100 ml flask 5 g of a cationic polymer (Polyquart® 701 NA, Cognis) were placed and dispersed in 10 g water under vigorous agitation to form component C. Subsequently, components B was drop wise and under vigorous agitation added to component A. Once the mixture was homogenised, component C was also added drop by drop to form the capsules.

Application Tests

All applications tests were performed by adding 2.5% b.w. of the encapsulated product (equivalent to 6.25 g capsules per 250 g paint) either to a semi-gloss paint (Pintura Satinada Ciclón, Bruguer) or a flat paint (Pintura Mate Ciclón, Bruguer) under vigorous stirring (2,000 rpm, 10 min). Once the products were homogenised the following parameters were determined:

Paint viscosity (according to Brookfield) after the addition of the capsules and paint stability after storage at 50° C.;

Preparation of films (20 g of paint) by means of a brush (visual defects);

Paint draw down at 100 μm (visual defects).

The tests according to the present invention were conducted with microcapsules obtained according to working example 1. The results are shown in Table 2:

TABLE 2

Application tests

| Type | Properties | Example 1 |
|---|---|---|
| Flat paint | Viscosity, 1 d (25° C.) | 5.400 |
| | Viscosity 20 d (50° C.) | 5.750 |
| | Viscosity 2 m (50° C.) | 6.100 |
| | Brush test | no defects |
| | Draw-down test | no spots |
| Satin paint | Viscosity, 1 d (25° C.) | 7.300 |
| | Viscosity 20 d (50° C.) | 9.250 |
| | Viscosity 2 m (50° C.) | 8.550 |
| | Brush test | no defects |
| | Draw-down test | no spots |

As one can see, the microcapsules according to the present invention allow the manufacture of flat, gloss and semi-gloss paints with stable viscosity. In the application said paints exhibit an excellent performance, the obtained films do not show any defects or spots or craters.

We claim:

1. A method of preparing a paint or lacquer, comprising adding one or more microencapsulated oil phase active components to a paint or lacquer base, the microcapsules being formed by a process conducted at a constant temperature comprising the steps of:
   (a1) preparing an emulsion from an oil phase consisting essentially of one or more oil phase active components and, optionally, one or more additional oil components and/or emulsifiers;
   (a2) treating said emulsion with an aqueous solution of one or more anionic polymers to form a matrix;
   (a3) contacting said matrix with an aqueous solution of one or more cationic polymers to form capsules; and
   (a4) optionally, separating said capsules from the aqueous phase;
   or
   (b1) preparing an emulsion from an oil phase consisting essentially of one or more oil phase active components and, optionally, one or more additional oil components and/or emulsifiers;
   (b2) treating said emulsion with an aqueous solution of one or more cationic polymers to form a matrix;
   (b3) contacting said matrix with an aqueous solution of one or more anionic polymers to form capsules; and
   (b4) optionally, separating said capsules from the aqueous phase,
   wherein said microcapsules have an average diameter of 0.1 to 25 μm.

2. The method of claim 1, wherein at least 50% by weight of said microcapsules have a diameter in a range of 0.5 to 5 μm.

3. The method of claim 1, wherein said oil phase active component comprises at least one member selected from the group consisting of perfumes, fragrances, aromas, insecticides and biocides.

4. The method of claim 1, wherein said oil component comprises at least one member selected from the group consisting of Guerbet alcohols based on fatty alcohols having 6 to 18 carbon atoms, esters of linear C6-C22 fatty acids with linear or branched C6-C22 fatty alcohols, esters of branched C6-C13 carboxylic acids with linear or branched C6-C22 fatty alcohols, esters of C18-C38 alkylhydroxy carboxylic acids with linear or branched C6-C22 fatty alcohols, esters of linear and/or branched fatty acids with polyhydric alcohols and/or Guerbet alcohols, triglycerides based on C6-C10 fatty acids, liquid mono-/di-/triglyceride mixtures based on C6-C18 fatty acids, esters of C6-C22 fatty alcohols and/or Guerbet alcohols with aromatic carboxylic acids, esters of C2-C12 dicarboxylic acids with C1-22 linear or branched alcohols or C7-10 polyols having 2 to 6 hydroxyl groups, vegetable oils, branched primary alcohols, substituted cyclohexanes, linear and branched C6-C22 fatty alcohol carbonates, Guerbet carbonates, based on C6-18 fatty alcohols, linear or branched, symmetrical or asymmetrical dialkyl ethers having 6 to 22 carbon atoms per alkyl group, ring-opening products of epoxidized fatty acid esters with polyols, silicone oils, aliphatic hydrocarbons, naphthenic hydrocarbons and mineral oils.

5. The method of claim 1, wherein said emulsifier comprises a non-ionic surfactant.

6. The method of claim 1, wherein said emulsifier comprises a member selected from the group consisting of products of the addition of 2 to 30 mol ethylene oxide and/or 0 to 5 mol propylene oxide to linear C8-22 fatty alcohols, addition of 2 to 30 mol ethylene oxide and/or 0 to 5 mol propylene oxide to C12-22 fatty acids, addition of 2 to 30 mol ethylene oxide and/or 0 to 5 mol propylene oxide to alkyl phenols containing 8 to 15 carbon atoms in the alkyl group, C12-18 fatty acid monoesters, diesters of addition products of 1 to 30 mol ethylene oxide to glycerol, glycerol monoesters, glycerol diesters, sorbitan monoesters and sorbitol diesters of saturated and unsaturated fatty acids containing 6 to 22 carbon atoms and ethylene oxide addition products thereof, addition products of 2 to 60 mol ethylene oxide onto castor oil and/or hydrogenated castor oil, polyol esters and partial esters based on linear, branched, unsaturated or saturated C6-22 fatty acids, ricinoleic acid, 12-hydroxystearic acid and glycerol, polyglycerol, pentaerythrital, dipentaerythritol, sugar alcohols, alkyl glucosides and polysaccharides, C6-C22 alkyl and/or alkenyl oligoglycosides, mono-, di and/or trialkyl phosphates and mono-, di- and/or tri-PEG-alkyl phosphates and salts thereof; wool wax alcohols, polysiloxane/polyalkyl polyether copolymers and corresponding derivatives; mixed esters of pentaerythrital, fatty acids, citric acid and fatty alcohol and/or mixed esters of C6-22 fatty acids, methyl glucose and polyols; glycerol carbonate, and mixtures thereof.

7. The method of claim 1, wherein said anionic polymers comprise a member selected from the group consisting of anionic polysaccharides, poly(meth)acrylic acids, poly(meth)acrylic acid esters, alginic acid, alginic acid salts and mixtures thereof.

8. The method of claim 1, wherein said anionic polymer comprises a polyacrylate based on glycerol.

9. The method of claim 1, wherein said paint or lacquer comprises from 0.001% to 25% by weight of said microcapsules.

10. A paint or lacquer comprising one or more microencapsulated oil phase active components, the microcapsules being formed by a process conducted at a constant temperature comprising the steps of:
   (a1) preparing an emulsion from an oil phase consisting essentially of one or more oil phase active components and, optionally, one or more additional oil components and/or emulsifiers;
   (a2) treating said emulsion with an aqueous solution of one or more anionic polymers to form a matrix;
   (a3) contacting said matrix with an aqueous solution of one or more cationic polymers to form capsules; and
   (a4) optionally, separating said capsules from the aqueous phase;
   or (b1) preparing an emulsion from an oil phase consisting essentially of one or more oil phase active components and, optionally, one or more additional oil components and/or emulsifiers;
(b2) treating said emulsion with an aqueous solution of one or more cationic polymers to form a matrix;
(b3) contacting said matrix with an aqueous solution of one or more anionic polymers to form capsules; and
(b4) optionally, separating said capsules from the aqueous phase,
wherein said microcapsules have an average diameter of 0.1 to 25 µm.

11. The paint or lacquer of claim 10 comprising 0.001% to 25% by weight of said microcapsules.

12. The method of claim 1, wherein the contacting step of (a3) or (b3) is done by dropwise addition of the aqueous solution of one or more cationic or anionic polymers, respectively, to form the capsules.

13. The paint or lacquer of claim 10, wherein the contacting step of (a3) or (b3) is done by dropwise addition of the aqueous solution of one or more cationic or anionic polymers, respectively, to form the capsules.

14. The method of claim 1, wherein the process in conducted at room temperature.

15. The paint or lacquer of claim 10, wherein the process in conducted at room temperature.

* * * * *